United States Patent
Kim et al.

(10) Patent No.: US 8,472,700 B2
(45) Date of Patent: Jun. 25, 2013

(54) METHOD AND APPARATUS FOR CREATING 3D FACE MODEL BY USING MULTI-VIEW IMAGE INFORMATION

(75) Inventors: Ho Won Kim, Daejeon (KR); Bon Ki Koo, Daejeon (KR); Chang Woo Chu, Daejeon (KR); Seong Jae Lim, Daejeon (KR); Jeung Chul Park, Daejeon (KR); Ji Young Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1093 days.

(21) Appl. No.: 12/314,676

(22) Filed: Dec. 15, 2008

(65) Prior Publication Data

US 2009/0153553 A1    Jun. 18, 2009

(30) Foreign Application Priority Data

Dec. 15, 2007  (KR) .................. 10-2007-0131729

(51) Int. Cl.
*G06K 9/00* (2006.01)
*G06T 15/00* (2006.01)
*G01C 3/14* (2006.01)
*H04N 13/00* (2006.01)

(52) U.S. Cl.
USPC ............. 382/154; 345/419; 356/12; 348/42

(58) Field of Classification Search
USPC ....... 382/154, 285; 345/419–427; 356/12–14; 348/42–60
See application file for complete search history.

(56) References Cited

U.S. PATENT DOCUMENTS

| | | | | |
|---|---|---|---|---|
| 5,745,668 | A * | 4/1998 | Poggio et al. | 345/475 |
| 6,163,322 | A * | 12/2000 | LaChapelle | 345/473 |
| 6,504,546 | B1 * | 1/2003 | Cosatto et al. | 345/473 |
| 6,876,364 | B2 * | 4/2005 | Buddemeier et al. | 345/473 |
| 6,967,658 | B2 * | 11/2005 | Hunter et al. | 345/473 |
| 7,098,920 | B2 | 8/2006 | Marschner et al. | |
| 7,379,071 | B2 * | 5/2008 | Liu et al. | 345/582 |
| 8,026,917 | B1 * | 9/2011 | Rogers et al. | 345/473 |
| 8,130,225 | B2 * | 3/2012 | Sullivan et al. | 345/473 |
| 8,144,153 | B1 * | 3/2012 | Sullivan et al. | 345/473 |
| 2005/0078124 | A1 * | 4/2005 | Liu et al. | 345/629 |
| 2006/0126928 | A1 * | 6/2006 | Edwards et al. | 382/154 |
| 2006/0192785 | A1 * | 8/2006 | Marschner et al. | 345/473 |
| 2008/0136814 | A1 * | 6/2008 | Chu et al. | 345/419 |

(Continued)

FOREIGN PATENT DOCUMENTS

| | | |
|---|---|---|
| JP | 9-73559 | 3/1997 |
| KR | 2000-0051216 | 8/2000 |
| KR | 10-2003-0070578 | 8/2003 |
| KR | 10-2006-0109044 | 10/2006 |

OTHER PUBLICATIONS

Zhang et al., "Hierarchical Facial Data Modeling for Visual Expression Synthesis", Journal of Visualization, 2003.*

(Continued)

*Primary Examiner* — Aaron W Carter
(74) *Attorney, Agent, or Firm* — Staas & Halsey LLP

(57) ABSTRACT

A method for creating a 3D face model by using multi-view image information, includes: creating a mesh structure for expressing an appearance of a 3D face model by using a first multi-view image obtained by capturing an expressionless face of a performer; and locating joints of a hierarchical structure in the mesh structure, by using a second multi-view image obtained by capturing an expression performance of the performer. Further, the method includes creating a 3D face model that is animated to enable reproduction of a natural expression of the performer, by setting dependency between the joints and the mesh structure.

10 Claims, 4 Drawing Sheets

U.S. PATENT DOCUMENTS

| | | | |
|---|---|---|---|
| 2008/0170077 A1* | 7/2008 | Sullivan et al. | 345/473 |
| 2008/0170777 A1* | 7/2008 | Sullivan et al. | 382/154 |
| 2010/0189342 A1* | 7/2010 | Parr et al. | 382/154 |
| 2011/0304622 A1* | 12/2011 | Rogers et al. | 345/420 |

OTHER PUBLICATIONS

Zhang et al., "Hierarchical Face Modeling and Fast 3D Facial Expression Synthesis", IEEE, Proceedings of the XV Brazilian Symposium on Computer Graphics and Image Processing, 2002.*

Daniel Vlasic et al., "Face Transfer with Multilinear Models", Siggraph, vol. 24, No. 3, pp. 426-433, 2005.

V. Blanz et al., "Reanimating Faces in Images and Video", The Eurographics Association and Blackwell Publishers 2003, vol. 22, No. 3, pp. 71-78.

Korean Office Action issued on Mar. 10, 2009 in corresponding Korean Patent Application 10-2007-0121729.

* cited by examiner

FIG. 5
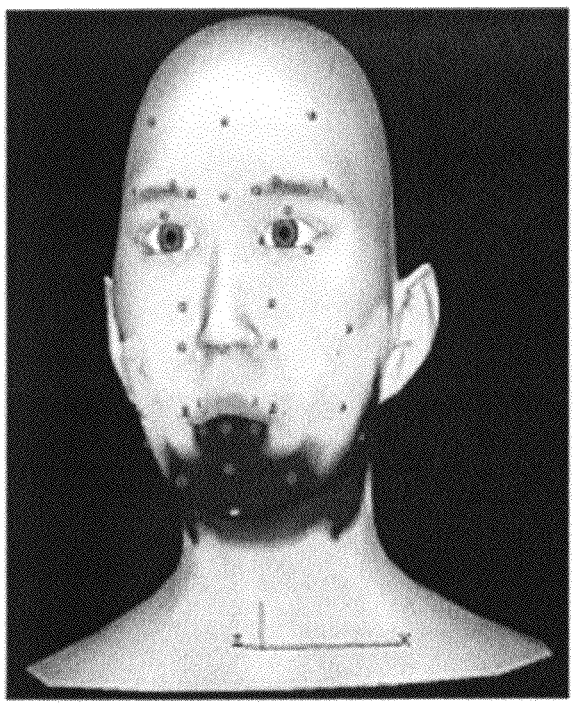
(502)
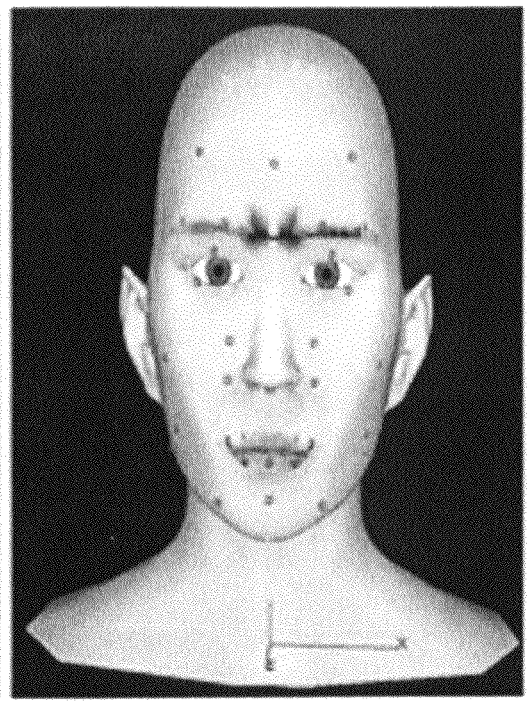
(504)

METHOD AND APPARATUS FOR CREATING 3D FACE MODEL BY USING MULTI-VIEW IMAGE INFORMATION

CROSS-REFERENCE TO RELATED APPLICATIONS

The present invention claims priority of Korean Patent Application No. 10-2007-0131729, filed on Dec. 15, 2007, which is incorporated herein by reference.

FIELD OF THE INVENTION

The present invention relates to a technology for creating a 3D face model, and more particularly to a method and an apparatus for creating a 3D face model by using multi-view image information that automatically expresses a natural appearance of a performer, controls a posture of a face, and realizes a natural expression of a face by using a multi-view image obtained by capturing an expressionless face and an expression performance of a performer using multi-view cameras.

BACKGROUND OF THE INVENTION

Conventional technologies for capturing an appearance and an expression of a face are classified into two main categories. In the first method, information regarding a static appearance of a face is scanned using an active sensor such as a laser and a pattern ray, markers are attached to portions of the face such as the eyes, the mouth and the cheeks of the face, where main changes in an expression of the face occur, a motion of the face is captured by tracing the markers, and a face animation is created by manually combining the two pieces of information by designers.

Actually, the method is widely utilized to obtain special effects of high quality in image contents such as a movie and a commercial film. However, the method requires manual operations of skilled designers and artists to combine the information obtained by different type of sensors, and is time-consuming in creating a model. On the other hand, the method enables easy creation of a new face animation or easy edition and correction of an animation once a face model is created.

Another technology for capturing an appearance and an expression of a face includes functions for simultaneously capturing information regarding an appearance shape of a face and information regarding an expression of the face. Representative technologies of this type include a space-time stereo method in which an existing 3D scanner technology is expanded to capture the shape of a face that changes with time and an approach method using a MOVA system in which special make-up is applied to a face and information regarding the geometric shape of a face that changes with time and texture information are simultaneously extracted by mounting a special filter to a camera to recognize the special make-up. These methods enables capture of information regarding an expression of a face that changes with time, but require well-controlled illumination environments and photographing conditions.

As mentioned above, the conventional technologies for capturing the appearance and expression of a face require many manual operations of skilled designers and artists and need well-controlled illumination environments and photographing conditions when information is obtained by capturing the expression of the face.

SUMMARY OF THE INVENTION

In view of the above, the present invention provides a method and an apparatus for creating a 3D face model by using multi-view image information that enables creation of a 3D model using information regarding an appearance of a face by using an image sensor and reproduces a 3D model using an expression of a face of a performer.

The present invention also provides a method and an apparatus for creating a 3D face model by using multi-view image information that enables creation of a 3D model including a triangular mesh structure expressing information regarding a natural geometric appearance of a performer and joints of a hierarchical structure for controlling the mesh structure.

The present invention also provides a method and an apparatus for creating a 3D face model by using multi-view image information that enables automatic expression of a natural appearance of a performer, control a posture of a face and enables realization of a natural expression of a face by using a multi-view image obtained by capturing an expressionless face and an expression performance of a performer using multi-view cameras.

In accordance with a first aspect of the present invention, there is provided a method for creating a 3D face model by using multi-view image information. The method includes: creating a mesh structure for expressing an appearance of a 3D face model, by using a first multi-view image obtained by capturing an expressionless face of a performer; locating joints of a hierarchical structure in the mesh structure, by using a second multi-view image obtained by capturing an expression performance of the performer; and creating a 3D face model that is animated to enable reproduction of a natural expression of the performer, by setting dependency between the joints and the mesh structure.

In accordance with a second aspect of the present invention, there is provided an apparatus for creating a 3D face model by using multi-view image information. The apparatus includes: an image input unit creating a first multi-view image by capturing an expressionless face of a performer; an appearance restoring unit creating a mesh structure for expressing an appearance of a 3D face model by using the first multi-view image; a standard face model transfer unit flattening the mesh structure created in the appearance restoring unit by transferring standard model information to the mesh structure, and enabling manipulation of a moved portion of the 3D face model; and a natural expression learning unit creating a 3D face model that is animated to enable reproduction of a natural expression of the performer, by locating joints of a hierarchical structure in the mesh structure output from the standard face model transfer unit using a second multi-view image obtained by capturing an expression performance of the performer and setting dependency between the joints and the mesh structure.

The effects obtained by the representative embodiment of the present invention are as follows.

Since the present invention enables creation of a 3D face model capable of automatically realizing a natural appearance and a natural expression of a performer only using multi-view image information containing an expressionless face and an expression performance of the performer, it may be applied to not only a conventionally restricted environmental condition but also various indoor/outdoor environmental conditions, enables reduction of model creating time by automatically processing manual operations of designers, and enables easy edition and correction of the appearance and expression of a face by controlling the expression or posture of the face through control of joints of a hierarchical structure.

BRIEF DESCRIPTION OF THE DRAWINGS

The objects and features of the present invention will become apparent from the following description of embodiment given in conjunction with the accompanying drawings, in which:

FIG. 5 is a view illustrating dependency between joints and a mesh structure in accordance with an embodiment of the present invention.

DETAILED DESCRIPTION OF THE EMBODIMENTS

Hereinafter, embodiment of the present invention will be described in detail with reference to the accompanying drawings which form a part hereof.

Figure 1:
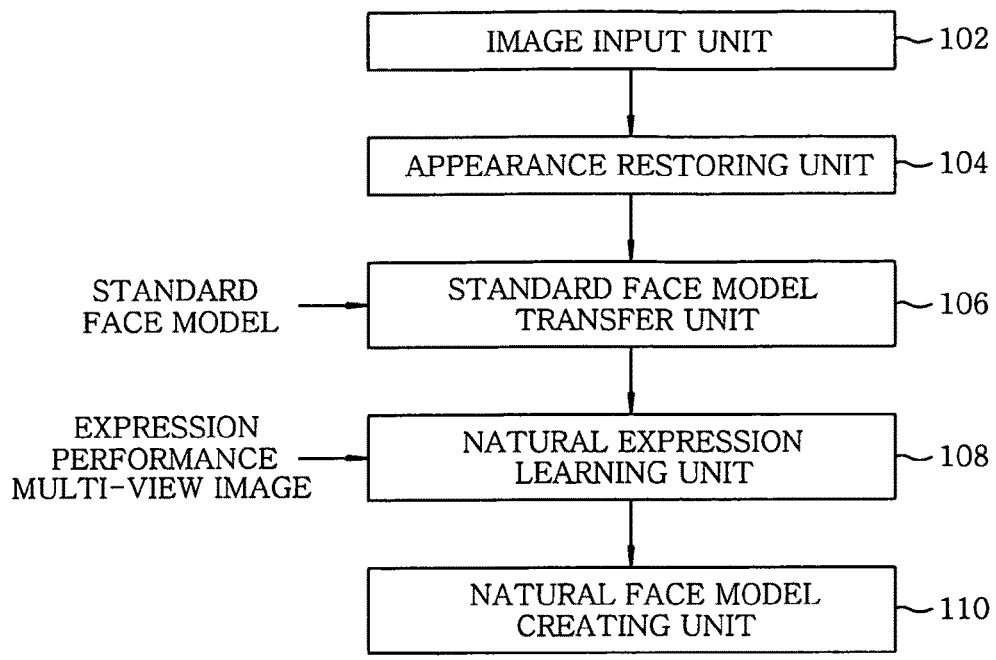
FIG. 1 is a block diagram illustrating a structure of a natural face model creator in accordance with an embodiment of the present invention.

FIG. 1 is a block diagram illustrating a natural face model creator in accordance with an embodiment of the present invention.

Referring to FIG. 1, the natural face model creator 100 creates a natural face model of a performer by using multi-view image information regarding a face captured through multi-view cameras, and includes an image input unit 102, an appearance restoring unit 104, a standard face model transfer unit 106, a natural expression learning unit 108, and a natural face model creating unit 110.

The image input unit 102 includes multi-view cameras capturing an expressionless face of a performer that faces the front side to create a natural face model. A multi-view image obtained by capturing the expressionless face of the performer is provided to the appearance restoring unit 104. The appearance restoring unit 104 restores a 3D appearance of the face of the performer by using multi-view image information provided from the image input unit 102. Then, the appearance includes information regarding the geometric shape and color of the face. The standard face model transfer unit 106 creates a natural face model by transferring a standard face model provided from outside to information regarding the restored appearance.

Thereafter, the natural expression learning unit 108 performs a natural expression learning process, by using a multi-view image obtained by capturing of a performer and provided from the outside to reproduce an expression of the created natural face model. The natural face model creating unit 110 creates a 3D face model enabling control of the natural appearance of a performer and the posture and expression of a face.

Figure 2:
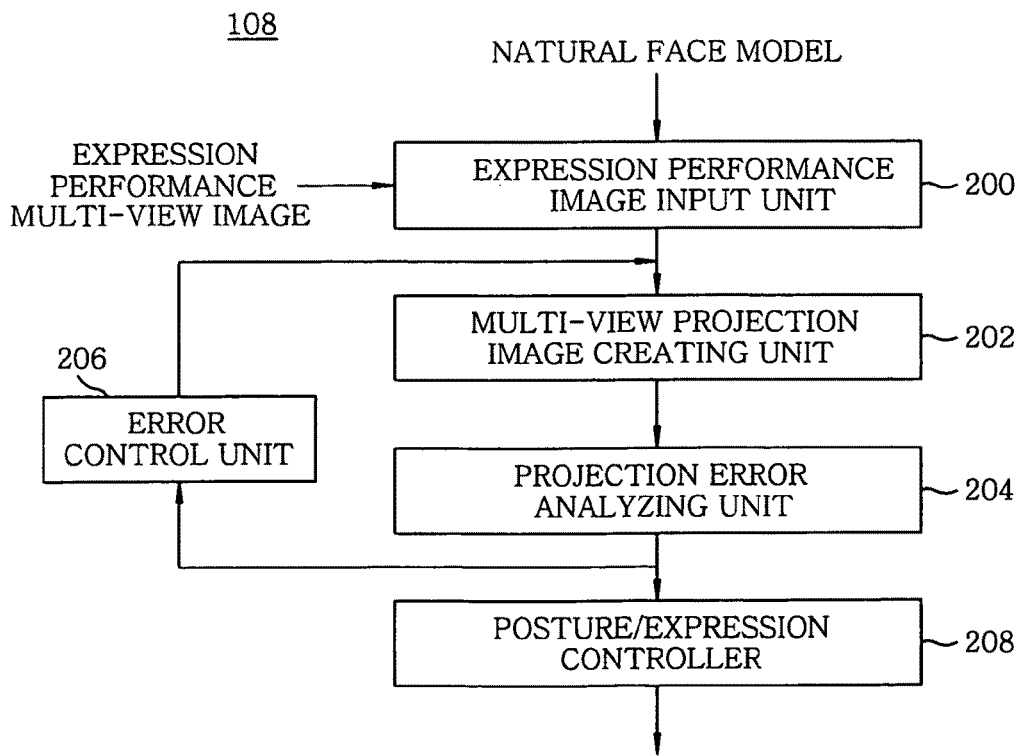
FIG. 2 is a block diagram illustrating a structure of a natural expression learning unit in accordance with an embodiment of the present invention.

FIG. 2 is a block diagram illustrating a detailed structure of a natural expression learning unit in accordance with an embodiment of the present invention.

With reference to FIG. 2, the natural expression learning unit 108 reproduces an expression of a created natural face model, and includes an expression performance image input unit 200, a multi-view projection image creating unit 202, a projection error analyzing unit 204, an error control unit 206 and a posture/expression controller 208.

The expression performance image input unit 200 receives a multi-view image obtained by capturing an expression performance of a performer, and the multi-view projection image creating unit 202 creates a multi-view image of a natural face model by projecting the natural face model provided from the standard model transfer unit 106 to a multi-view camera to learn a natural expression of a performer. The natural face model is projected in units of meshes, and the projected mesh region replaces the color value of a pixel by a texture of the corresponding mesh.

The pixels of the multi-view image created in this way have one-to-one correspondences with those of the input expression performance multi-view image. The projection error analyzing unit 204 analyzes a projection error between the natural face model and the expression performance multi-view image through the one-to-one correspondences. The projection error is obtained by adding color errors of all pixels corresponding to a face region of the input expression performance multi-view image. Then, when the projection error is larger than a threshold value, the error control unit 206 controls the posture and expression of the natural face model through control of joints, transfers the natural face model information, that has underwent the control of joints, to the multi-view projection image creating unit 202 again, and finally eliminates the projection error by making the projection error a minimum one smaller than the threshold value.

When the projection error becomes smaller than a threshold value through an error control, the posture/expression controller 208 allows a natural face model to reproduce a natural expression as well as an appearance of a performer by checking translation of meshes dependent on joints and repeating control of locations of the joints and dependency of adjacent meshes.

Figure 3:
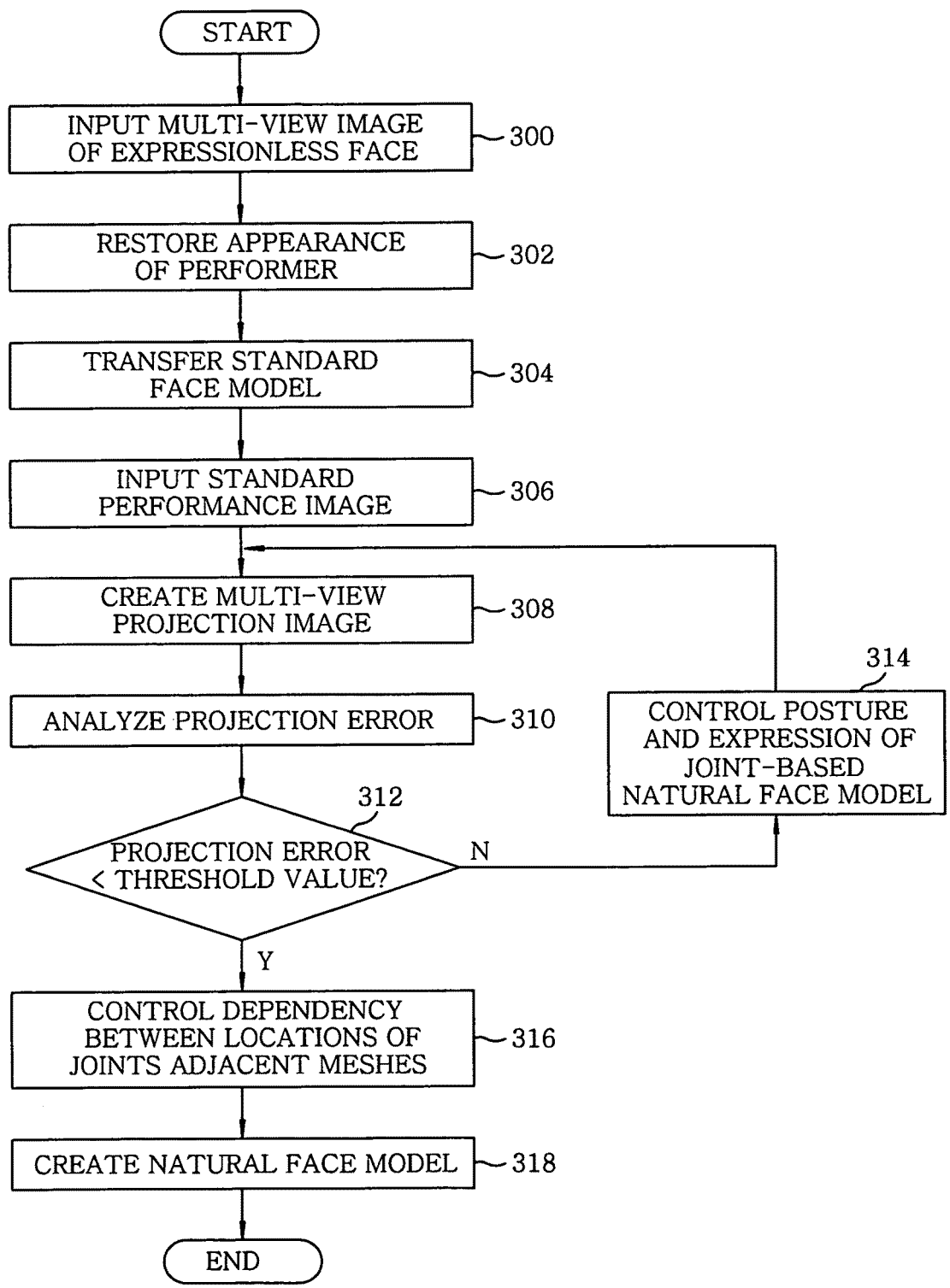
FIG. 3 is a flowchart illustrating a procedure of creating a natural face model of a performer by using multi-view image information in accordance with an embodiment of the present invention.

FIG. 3 is a flowchart illustrating a procedure for creating a natural face model of a performer by using multi-view image information in accordance with the present invention.

With reference to FIG. 3, in the step 300, multi-view information of a face captured through multi-view cameras is input. At least two cameras are circularly disposed at the periphery of a face to maximally capture information regarding a natural shape of the face by using the cameras. Then, the cameras are directed at the face. Thereafter, an expressionless multi-view image obtained by capturing an expressionless face of a performer that faces the front side using the multi-view cameras is input.

In the step 302, portions of images in the input multi-view information, which correspond to a face region are separated as foregrounds, and the geometric shape of the 3D appearance is restored in a mesh structure by using foreground region information of the cameras and color information in the foregrounds. Then, the appearance includes the geometric shape of the face and the color information of the face.

Then, a surface of the restored mesh structure may not be smooth due to the characteristics of the skin of the face. In the step 304, the mesh structure is flattened and a standard face model is transferred to the mesh structure to manipulate the eyes or the mouth of a face that may be opened and closed.

Figure 4:
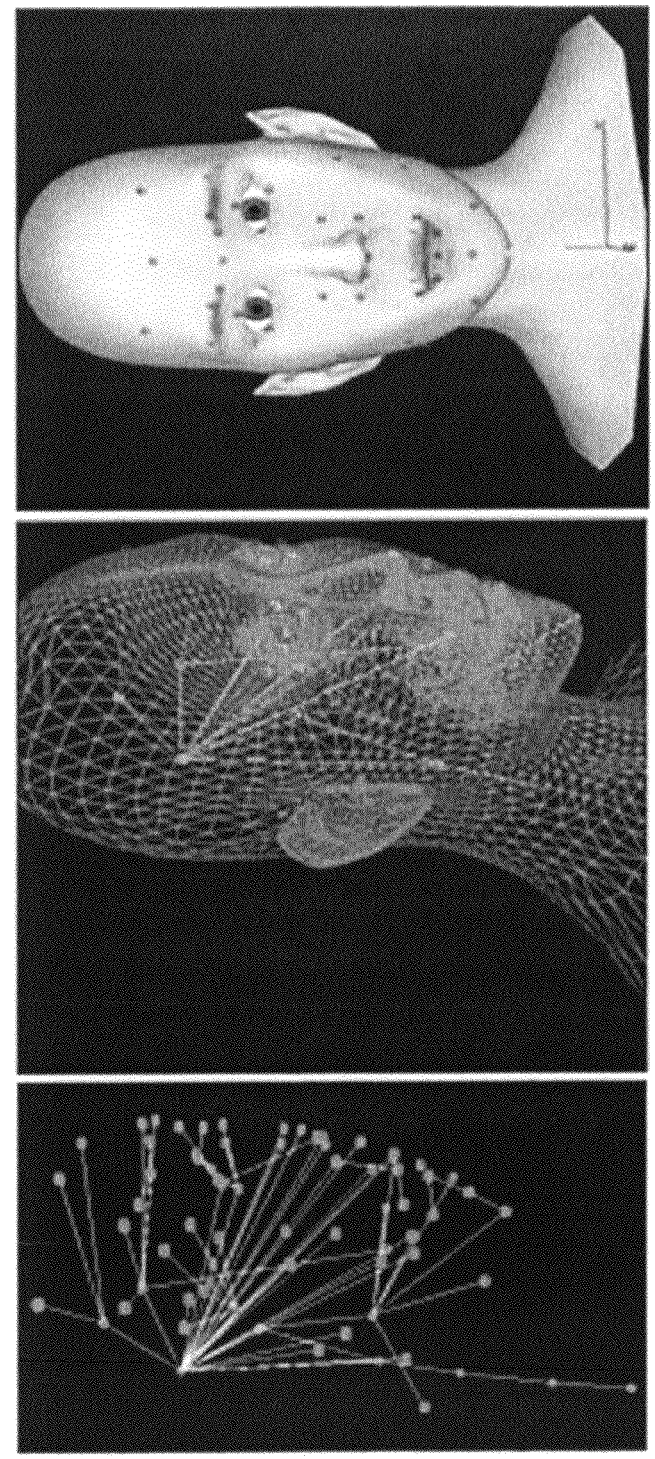
FIG. 4 is a view illustrating a hierarchical joint structure of a 3D face model, a mesh structure for expressing a geometric appearance, and information regarding textures of meshes in accordance with an embodiment of the present invention.

FIG. 4 is a view illustrating a hierarchical joint structure of a 3D face model, a mesh structure for expression of a geometric appearance, and texture information of meshes in accordance with an embodiment of the present invention.

With reference to FIG. 4, a standard face model includes a mesh structure 402 designed to easily express an appearance of a standard face and create an expression, joints 400 having a hierarchical structure, information regarding dependency between the joints and the mesh structure, and information regarding a color texture 404 for expression of the skin of the face. The meshes of the standard face model are transferred to a location most adjacent to the restored mesh structure in the 3D space, maintaining the original surface flattening degree. The geometric shape of the mesh structure that represents the appearance of the standard model is transferred in correspondence to the shape of a performer through the standard model transfer process in the step 304.

Thereafter, in order to replace the texture with the appearance of the performer in the standard face model whose shape is deformed, first, the meshes of the transferred face model is projected to a multi-view image, and color information of the projected image whose area is largest is replaced by the texture of the corresponding mesh. A face model to which the standard face model is transferred via the above-mentioned step is referred to as a natural face model. The natural face model can well express an appearance of a performer in an expressionless state, but cannot realize an expression of a performer since the dependency between a hierarchical joint structure of a standard model and meshes is not set.

In the step 306, a multi-view image obtained by capturing an expression performance of a performer is input to realize the face posture and natural expression of the performer through control of joints, and a natural expression learning process for setting the dependency between the locations of the joints of the natural face model and the meshes by using the multi-view image is carried out. In the step 308, a multi-view image of the natural face model is created by projecting the natural face model to multi-view cameras, in order to learn the natural expression of the performer. The natural face model is projected to a pinhole camera model in units of meshes by using internal factors and external factors of cameras, and the color values of pixels are replaced by a texture of the corresponding mesh in the projected mesh region.

The pixels of the multi-view image created in this way have one-to-one correspondences with those of the input expression performance multi-view image. In the step 310, a projection error between the two multi-view images is analyzed through the correspondences. The projection error is obtained by adding color errors of all pixels corresponding to the face region of the input multi-view image. When the projection error is determined not to satisfy a predefined threshold value in the step 312, the posture and expression of the natural face model is controlled through control of the joints in the step 314. The steps 308 to 314 are carried out until the projection error satisfies the threshold value, and the projection error of the corresponding region is eliminated by changing the 3D locations of the corresponding meshes generating the projection error using the remaining projection error information.

When the projection error is determined to be smaller than the threshold value in the step 312, a natural face model capable of controlling the posture and expression of a face is created by controlling the dependency between the locations of the joints and adjacent meshes in the step 316. Hereinafter, the above-mentioned process will be described in more detail with reference to FIG. 5.

FIG. 5 is a view illustrating dependency between joints and a mesh structure and a dependency weight in accordance with an embodiment of the present invention.

With reference to FIG. 5, after it is determined whether meshes 502 and 504 dependent on joints are sequentially translated from the highest joint controlling a posture of a face to the lowest joint located on the skin of the face to create an expression, when a mesh is translated, the translation of the mesh is reflected by resetting a dependency weight. Further, when a mesh is adjacent to the most peripheral border of an adjacent mesh of a joint, the corresponding mesh is reset to control the corresponding mesh by expanding the range of a mesh dependent region of the corresponding joint. In the step 316, the natural face model enables realization of both the appearance and natural expression of a performer by repeating the process of controlling the dependency between the locations of joints and adjacent meshes.

Here, the joints are located inside or on a surface of a mesh structure to deform the 3D locations and normal vectors of adjacent meshes using rotation and translation instructions and realize a posture of a face or a natural expression of a performer through control of joints of a hierarchical structure. The adjacent meshes are influenced by the rotation and translation instructions of the joints and are deformed by rotation and translation instructions obtained by multiplying the rotation and translation instructions of the joints by a weight representing a predefined dependency. Then, one mesh may be simultaneously dependent on several joints and may be simultaneously controlled by control instructions of several joints.

After the above-mentioned natural expression learning process, in the step 318, a 3D face model capable of controlling the natural appearance of a performer and the posture and expression of an expression is created by using multi-view image information obtained by capturing expressionless and expressive faces of a performer.

As mentioned above, the present invention automatically expresses a natural appearance of a performer, controls a posture of a face, and realizes a natural expression of a face by using a multi-view image obtained by capturing an expressionless face and an expression performance of a performer using multi-view cameras.

While the invention has been shown and described with respect to the embodiment, it will be understood by those skilled in the art that various changes and modifications may be made without departing from the scope of the invention as defined in the following claims.

What is claimed is:

1. A method for creating a 3D face model by using multi-view image information, the method comprising:
   creating a mesh structure for expressing an appearance of a 3D face model, by using a first multi-view image obtained by capturing an expressionless face of a performer;
   locating joints of a hierarchical structure in the mesh structure, by using a second multi-view image obtained by capturing an expression performance of the performer; and
   creating a 3D face model that is animated to enable reproduction of a natural expression of the performer, by setting dependency between the joints and the mesh structure.

2. The method of claim 1, wherein the joints are located inside or on a surface of the mesh structure to deform the 3D locations and normal vectors of adjacent meshes by rotation and translation instructions and reproduce the posture of the face of or the natural expression of the performer through control of the joints of the hierarchical structure.

3. The method of claim 2, wherein the adjacent meshes are influenced by the rotation and translation instructions of the joints, and the deformations of the adjacent meshes are carried out by rotation and translation instructions obtained by multiplying the rotation and translation instructions of the joints by a weight representing predefined dependency.

4. The method of claim 3, wherein one of the meshes are dependant on one or more joints simultaneously, and are simultaneously controlled by control instructions of the joints.

5. The method of claim 1, wherein the 3D face model is created by changing locations of the joints of the 3D face model, a range of the adjacent meshes influenced by the joints, and dependency weights, so that a same expression is reproduced by controlling the postures of the joints in the hierarchical structure of the 3D face model, using a multi-view image obtained by capturing an expression of the performer.

6. An apparatus for creating a 3D face model by using multi-view image information, the apparatus comprising:
an image input unit creating a first multi-view image by capturing an expressionless face of a performer;
an appearance restoring unit creating a mesh structure for expressing an appearance of a 3D face model by using the first multi-view image;
a standard face model transfer unit flattening the mesh structure created in the appearance restoring unit by transferring standard model information to the mesh structure, and enabling manipulation of a moved portion of the 3D face model; and
a natural expression learning unit creating a 3D face model that is animated to enable reproduction of a natural expression of the performer, by locating joints of a hierarchical structure in the mesh structure output from the standard face model transfer unit using a second multi-view image obtained by capturing an expression performance of the performer and setting dependency between the joints and the mesh structure.

7. The apparatus of claim 6, wherein the joints are located inside or on a surface of the mesh structure to deform the 3D locations and normal vectors of adjacent meshes by rotation and translation instructions and reproduce the posture of the face of or the natural expression of the performer through control of the joints of the hierarchical structure.

8. The apparatus of claim 7, wherein the adjacent meshes are influenced by the rotation and translation instructions of the joints, and the deformations of the adjacent meshes are carried out by rotation and translation instructions obtained by multiplying the rotation and translation instructions of the joints by a weight representing predefined dependency.

9. The apparatus of claim 8, wherein one of the meshes are dependant on one or more joints simultaneously, and are simultaneously controlled by control instructions of the joints.

10. The apparatus of claim 6, wherein the 3D face model is created by changing locations of the joints of the 3D face model, a range of the adjacent meshes influenced by the joints, and dependency weights, so that a same expression is reproduced by controlling the postures of the joints in the hierarchical structure of the 3D face model, using a multi-view image obtained by capturing an expression of the performer.

* * * * *